(12) United States Patent
Burcham

(10) Patent No.: US 8,216,019 B2
(45) Date of Patent: Jul. 10, 2012

(54) MAGNETIC BOX CALL

(75) Inventor: Gregory Burcham, Hartselle, AL (US)

(73) Assignee: EBSCO Industries, Inc., Birmingham, AL (US)

( * ) Notice: Subject to any disclaimer, the term of this patent is extended or adjusted under 35 U.S.C. 154(b) by 382 days.

(21) Appl. No.: 12/562,247

(22) Filed: Sep. 18, 2009

(65) Prior Publication Data
US 2011/0070806 A1 Mar. 24, 2011

(51) Int. Cl.
*A63H 5/00* (2006.01)
*A63H 33/26* (2006.01)

(52) U.S. Cl. .................... 446/418; 446/397; 446/129

(58) Field of Classification Search ............... 446/129, 446/130, 133, 137, 397, 418, 422
See application file for complete search history.

(56) References Cited

U.S. PATENT DOCUMENTS

| | | | | |
|---|---|---|---|---|
| 1,464,729 A | * | 8/1923 | Severy | 84/725 |
| 1,709,512 A | * | 4/1929 | Alderdice | 273/442 |
| 2,511,403 A | * | 6/1950 | Fleener | 446/397 |
| 2,697,298 A | * | 12/1954 | Bacon | 446/200 |
| 4,343,108 A | | 8/1982 | Lee | |
| 4,422,262 A | | 12/1983 | Moss | |
| 4,664,641 A | * | 5/1987 | Hearn et al. | 446/397 |
| 4,941,858 A | | 7/1990 | Adams | |
| 5,484,319 A | * | 1/1996 | Battey | 446/397 |
| 5,830,036 A | * | 11/1998 | Richardson | 446/397 |
| 5,846,119 A | | 12/1998 | Long | |
| 6,149,492 A | | 11/2000 | Davis, Jr. | |
| 6,168,493 B1 | | 1/2001 | Kirby | |
| 7,347,762 B1 | * | 3/2008 | Long | 446/418 |

* cited by examiner

*Primary Examiner* — Gene Kim
*Assistant Examiner* — Alyssa Hylinski
(74) *Attorney, Agent, or Firm* — Smith, Gambrell & Russell

(57) ABSTRACT

A game call having variable tonal qualities wherein one or more sound boards have a ferromagnetic material carried in a selected region and wherein a second ferromagnetic material is mounted for selective movement relative to the ferromagnetic material carried on the sound board to vary the tones created on the sound board.

11 Claims, 2 Drawing Sheets

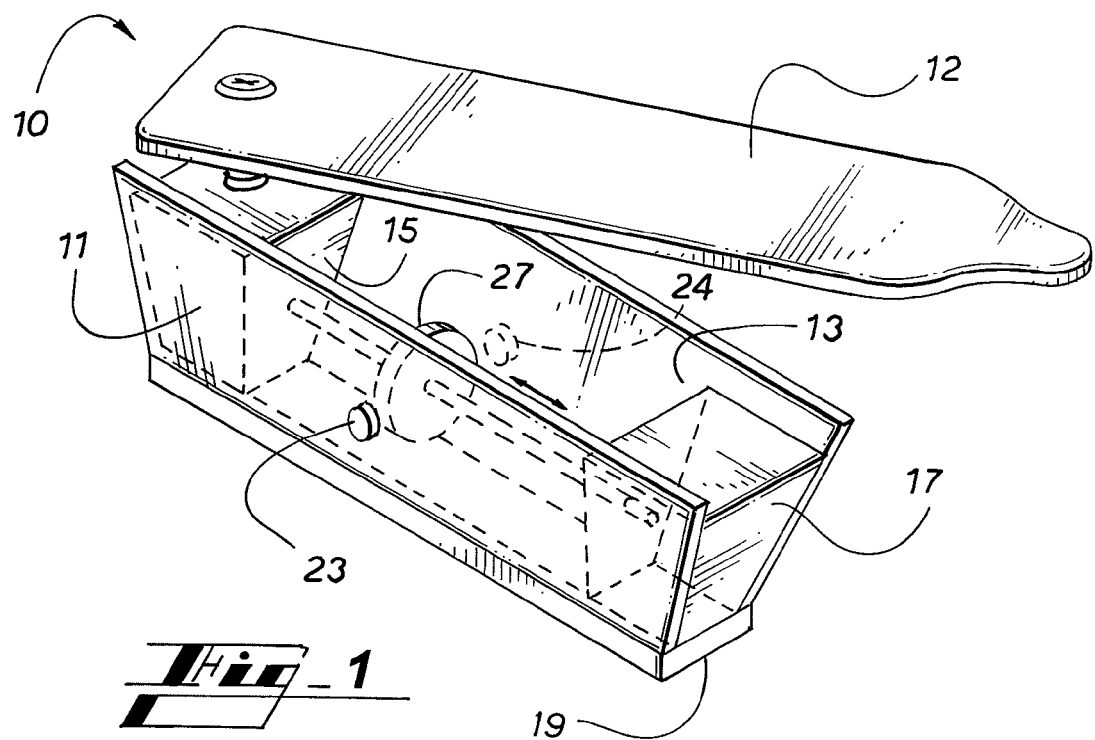
FIG. 1
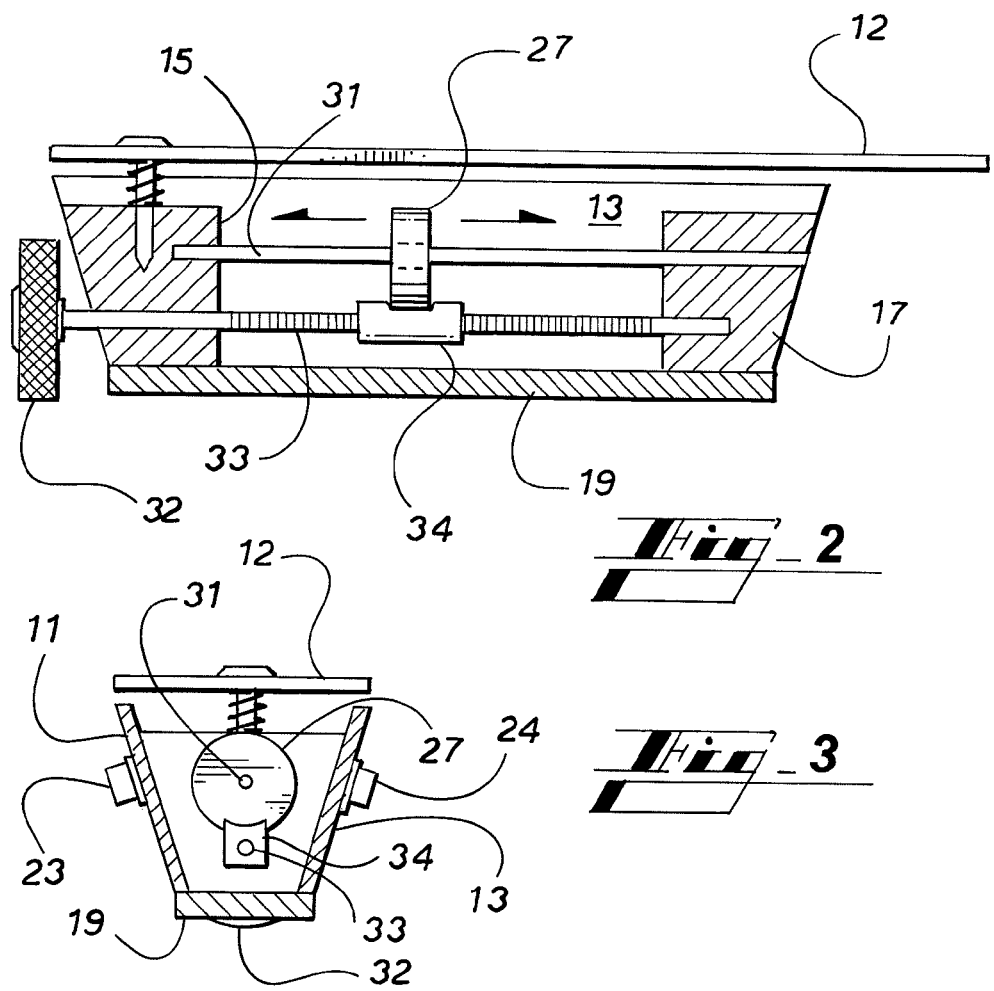
FIG. 2
FIG. 3

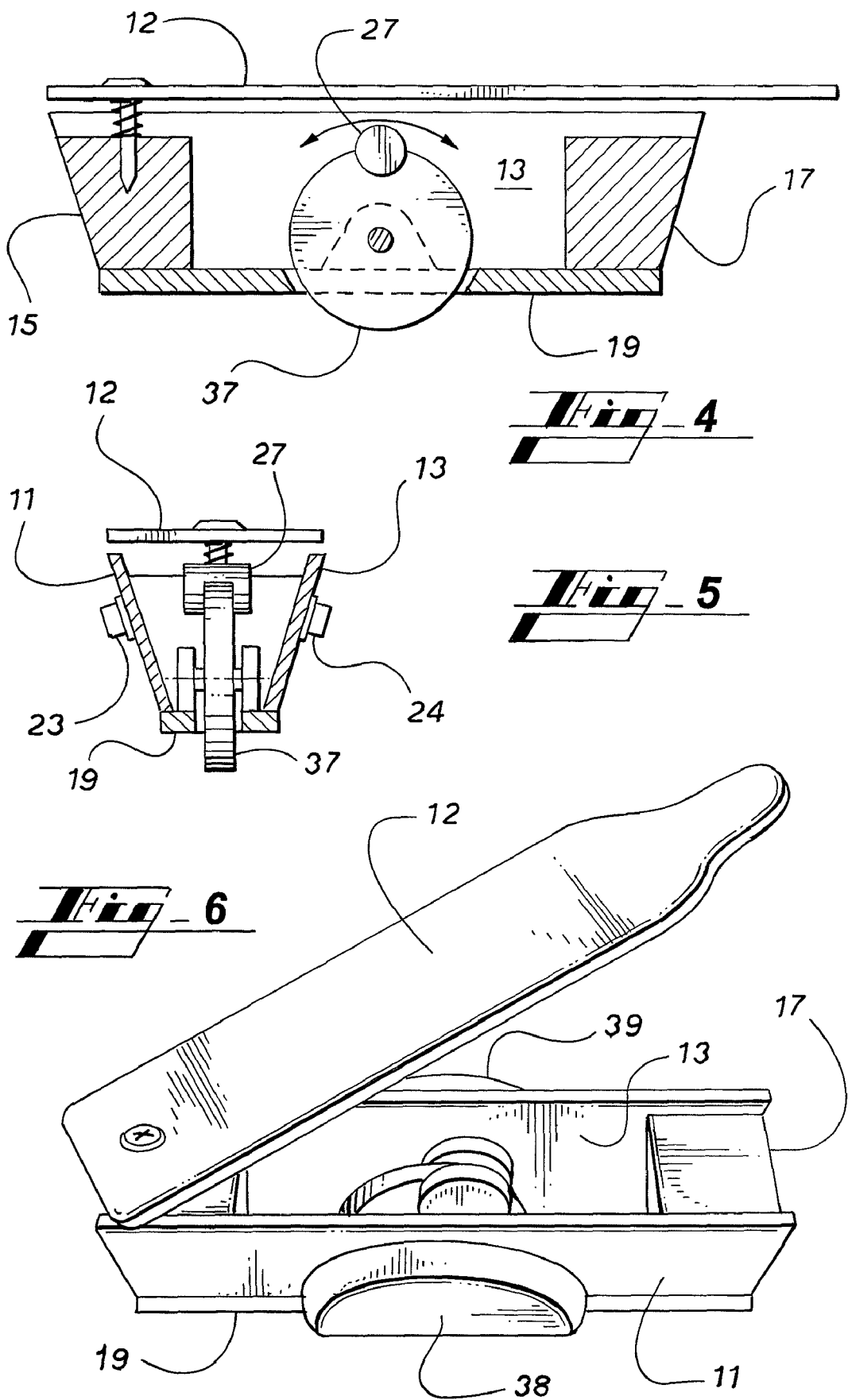

MAGNETIC BOX CALL

BACKGROUND OF THE INVENTION

The present invention relates to the field of hunting and more specifically to apparatus used by hunters and other wildlife enthusiasts to call wild game into their vicinity. More particularly, the present invention relates to the field of box calls generally. In even greater particularity the present invention is a call having a striker and a an plurality of variable pitch sounding plates.

SUMMARY OF THE PRESENT INVENTION

It is an object of the present invention to enable the hunter to quickly and easily tune his call to the sound of the hens or gobblers in his hunting area.

Another object of the invention is to enable the hunter to sound like several different birds while only using one call.

Still another object of the invention is to provide a variable pitch call that is simple to use and saves the hunter the necessity of carrying several different calls.

These and other objects and advantages of the invention will become apparent from the following detailed description of the preferred embodiment of the invention.

BRIEF DESCRIPTION OF THE DRAWINGS

The game call is depicted in the accompanying drawings which form a portion of this disclosure and wherein:

FIG. 1 is a perspective view of an embodiment of a box call having a linearly movable magnet mounted therein;

FIG. 2 is a side sectional view of the embodiment illustrated in FIG. 1;

FIG. 3 is an end sectional view of the embodiment illustrated in FIG. 1.

FIG. 4 is a side sectional view of a second embodiment of a box call having a rotatably mounted magnet mounted therein;

FIG. 5 is an end sectional view of the embodiment illustrated in FIG. 4;

FIG. 6 is a top perspective view of the embodiment shown in FIG. 5 without the striker plate attached;

DESCRIPTION OF THE PREFERRED EMBODIMENT

Referring to the FIGS. 1-4 for a clearer understanding of the invention, it may be seen that the preferred embodiment of the invention contemplates a box call 10 defined by a pair of longitudinal sounding plates 11 and 13 secured at each end to a pair of end blocks 15 and 17 and along their lower edges to a generally rectangular base plate 19. The construction and connection of the members thus described to one another may be of any conventional manner used in constructing box calls. Like wise attached to one end block 15 of the call a spring loaded striker plate 21 is mounted to selectively engage the upper edge of sounding plate 11 or 13 at the urging of the user.

Retained on the outside of each sounding plate 11 and 13 is a mass 23 and 24 of ferromagnetic material which may or may not be magnetized. Movably mounted within the box call is another ferromagnetic mass 27. It will be appreciated that either mass 27 or masses 23 and 24 may be magnets or all three may be magnets. The theory of operation of the instant invention is that longitudinal sound plates 11 and 13 can be made to vary their tonal qualities by changing the tension exerted on them by the magnetic material and by changing the location of the magnets 23 and 24 using the influence of to magnet 27. To do so the internal magnet 27 needs to be moved relative to the two side magnets such that the force between the internal magnet and each external magnet can be varied. As is known the attractive force between magnet 27 and ferromagnetic material 23 or 24 varies inversely proportionally to the distance between them. Thus if magnet 27 travels linearly along the center of the box and if ferromagnetic, masses 23 and 24 mirror each other then the magnetic tension exerted on each sounding plate will be equal. Alternatively, magnets 23 and 24 can be slidably retained on plates 11 and 13 such that they move to different locations responsive to the motion of magnet 27, thereby changing the pressure exerted to a different point on the plates and creating a different chordal quality for the plates 11 and 13. If the sounding plates have identical tonal qualities then the variation in tension and/or chordal quality will affect both plates to the same degree. This could be varied by spacing the magnets 23 and 24 along the length of the box such that magnet 27 moves closer to magnet 23 as it moves away from magnet 24. Of course the sounding boards may have inherently different tonal qualities and the magnets vary the qualities of each board based on proximity of the internal and external magnetic material.

As may be seen in FIGS. 1 to 3, magnet 27 may be mounted on a spindle 31 extending along the centerline of the box call. As the magnet is moved along the spindle 31, either manually, or by threaded connections such that the spindle may be rotated to urge the magnet long its length, the magnet moves and exerts its influence on the magnets 23 and 24 The spindle or an optional secondary drive spindle may be rotated by a thumbwheel 33 mounted for rotation in box 11 and rotating spindle 32 as shown in FIG. 3 wherein a drive wheel 33 is mounted on spindle 32 which engages a carrier 34 connected to the magnet. Spindles 31 and 32, drive wheel 33 and carrier 34 are preferably not ferromagnetic.

FIGS. 4 to 7 show a second embodiment wherein magnet 27 is mounted on the periphery of a non-ferrous disc 37 which is mounted for rotation about an axis transverse to the centerline of the box call. The disc 37 extends through the base 19 of the box call such that it can be rotated by the user to move the magnet 27, thereby varying the pitch of the call. As may be seen in FIG. 6 the magnets 23 and 24 are covered by protective covers 38 and 39, which serve to hold the magnet against the sounding panels and allow for more diverse sounds by allowing the magnets 23 and 24 to be relocated along the length of the plates.

If the magnets 23 and 24 are held against the sounding boards magnetically, the vibration of the sound boards will have a more raspy sound than if magnets 23 and 24 are adhered directly to the board. If the magnets 23 and 24 are separated from the soundboards by a piece of felt, then the sound is more even. If a semi-rigid material such as mylar is interposed between the magnets 23, 24 and the sound board, the sound is raspier and more desirable for a box call.

It is to be understood that the forms of the invention shown are preferred embodiments thereof and that various changes and modifications may be made therein without departing from the spirit of the invention or scope as defined in the following claims.

What is claimed is:

1. A game call comprising a box call with two sounding plates mounted on either side of a central cavity and a striker plate pivotally mounted to one end of the box call for selective interaction with one of the sounding plates to create sound, wherein at least one sounding plate has a ferromagnetic material supported adjacent it, a selectively moveable magnet mounted within said box call for selective positioning proximal a side of said at least one sounding plate opposite relative to said ferromagnetic material adjacent said at least one sounding plate for interaction therewith to modify the tonal qualities of said sounding plate.

2. A game call as defined in claim 1, wherein said selectively moveable magnet is mounted on a disc aligned with a longitudinal centerline of said box call and rotatable about an axis transverse to said centerline.

3. A game call as defined in claim 2, wherein said disc extends through a slot in said box call opposite said striker plate.

4. A game call as defined in claim 1, wherein the ferromagnetic material adjacent the at least one sounding plate is magnetized.

5. A game call as defined in claim 1, wherein said movable magnet is mounted for linear movement along a longitudinal centerline of said box call.

6. A game call as defined in claim 5, wherein said movable magnet is slidably moved along a rod extending along the centerline of said box call.

7. A came call as defined in claim 5, wherein said movable magnet is threadedly mounted on a rotatable screw.

8. A game call as defined in claim 7 wherein said rotatable screw is connected to a knob for rotation of said screw such that said moveable magnet is urged along said centerline.

9. A game call as defined in claim 1, wherein said ferromagnetic material is selectively positioned on said sounding plate responsive to selective positioning of said selectively movable magnet.

10. A game call as defined in claim 1, wherein said at least one sounding plate has a tonal quality that is variable by selectively positioning said selectively movable magnet relative to said ferromagnetic material.

11. A game call as defined in claim 1, wherein said at least one sounding plate has a tonal quality that is selectively variable by selectively positioning said ferromagnetic material on said sounding plate by selectively moving said selectively movable magnet.

\* \* \* \* \*